(12) United States Patent
Lurie (10) Patent No.: US 9,862,242 B2
(45) Date of Patent: Jan. 9, 2018

(54) COUPLING SYSTEM

(71) Applicant: Jason P. Lurie, Fort Worth, TX (US)

(72) Inventor: Jason P. Lurie, Fort Worth, TX (US)

(*) Notice: Subject to any disclaimer, the term of this patent is extended or adjusted under 35 U.S.C. 154(b) by 0 days.

(21) Appl. No.: 15/145,388

(22) Filed: May 3, 2016

(65) Prior Publication Data

US 2017/0174019 A1 Jun. 22, 2017

Related U.S. Application Data

(60) Provisional application No. 62/270,400, filed on Dec. 21, 2015.

(51) Int. Cl.
*B60D 1/01* (2006.01)
*B60D 1/24* (2006.01)

(52) U.S. Cl.
CPC ............. *B60D 1/015* (2013.01); *B60D 1/248* (2013.01)

(58) Field of Classification Search
CPC ........ B60D 1/015; B60D 1/248; B60D 1/247; B60D 1/46
See application file for complete search history.

(56) References Cited

U.S. PATENT DOCUMENTS

| | | | |
|---|---|---|---|
| 5,477,207 A | 12/1995 | Frame, Sr. et al. | |
| 5,625,335 A | 4/1997 | Kelly | |
| 5,861,802 A | 1/1999 | Hungerink et al. | |
| 5,863,057 A * | 1/1999 | Wessels | B62D 53/068 280/149.2 |
| 5,876,055 A | 3/1999 | Fontaine | |
| 5,915,713 A * | 6/1999 | Kniep | B62D 53/0807 280/418.1 |
| 6,100,794 A | 8/2000 | Hillier | |
| 6,285,278 B1 | 9/2001 | Schutt et al. | |
| 6,452,485 B1 * | 9/2002 | Schutt | B62D 53/0828 280/435 |
| 6,587,041 B1 | 7/2003 | Brown, Jr. | |
| 6,866,283 B2 | 3/2005 | Alguera et al. | |
| 7,140,632 B2 | 11/2006 | Alguera et al. | |
| 7,253,721 B2 | 8/2007 | Flohr et al. | |
| 7,548,155 B2 | 6/2009 | Schutt et al. | |
| 7,619,506 B2 | 11/2009 | Knoll et al. | |
| 7,789,412 B2 * | 9/2010 | Alguera | B62D 35/001 280/407 |
| 7,825,783 B2 | 11/2010 | Gallego et al. | |
| 7,932,816 B2 | 4/2011 | Schmidt et al. | |

(Continued)

*Primary Examiner* — Joseph M Rocca
*Assistant Examiner* — Marlon A Arce
(74) *Attorney, Agent, or Firm* — Decker, Jones P.C.; Brian K. Yost; Geoffrey A. Mantooth (57) ABSTRACT

A fifth wheel trailer coupling system comprises a plurality of proximity sensors which, through a controlled area network bus system, transmits data to an engine/electronic control module which, depending upon the sensor readings, is adapted to transmit an alert to an operator or transmit signals to control units to alter operating parameters of a tractor. The plurality of sensors comprises a fifth wheel position sense adapted to detect fifth wheel positioning beneath a trailer chassis; a kingpin sensor adapted to determine kingpin positioning within a fifth wheel yoke; a jaw sensor adapted to determine jaw positioning; a fifth wheel height sensor adapted to determine fifth wheel height; and a weight sensor adapted to measure the weight of the trailer near the weight sensor.

19 Claims, 11 Drawing Sheets

(56) References Cited

U.S. PATENT DOCUMENTS

| | | |
|---|---|---|
| 7,967,319 B2 | 6/2011 | Alguera |
| 8,615,347 B2 | 12/2013 | Alguera Gallego et al. |
| 2002/0179345 A1* | 12/2002 | Bell .................. B60C 23/002 180/24.02 |
| 2003/0205869 A1* | 11/2003 | Schutt ............... B60G 17/0155 280/5.514 |
| 2008/0191449 A1 | 8/2008 | Standen |

* cited by examiner

Fig. 17

COUPLING SYSTEM

BACKGROUND OF THE INVENTION

1. Field of the Invention

The present invention relates generally to coupling systems adapted for use in trailer coupling arrangements and specifically to a fifth wheel coupling arrangement for use in coupling a tractor and trailer.

2. Description of the Prior Art

Trucks, sometimes referred to as "Tractor Units" or "Tractors", are often coupled with trailers to move cargo stored on or in the trailer. Often, tractors are coupled to trailers by means of a "fifth-wheel" hitch assembly. This coupling assembly comprises a kingpin, a steel pin on the front of the trailer, and a horseshoe-shaped coupling device (yoke) mounted on the tractor. A surface of the trailer ("trailer plate" with the kingpin at the center) rotates against a surface of the yoke which does not rotate.

A special kind of tractor, sometimes called a "yard truck" is often used in terminals, such as intermodal terminals, in which trailers are moved from one place to another. A yard truck comprises a yoke coupled to a boom assembly. The boom assembly permits the yoke to be raised a desired distance such that the legs of the trailer are raised above the driving surface. This arrangement obviates the need to raise and lower the legs individually as when, for example, a conventional tractor is coupled to the trailer. This raising of the boom and corresponding raising of the trailer has the effect of raising the trailer's center of gravity. As some trailers are very heavy when filled with cargo, the higher center of gravity of a raised trailer may cause the trailer to be more susceptible to overturning than a trailer that is not raised with a fifth wheel boom.

Whether the trailer is raised or not, most tractors have a system in which the yoke closes around the neck of the kingpin to prevent the kingpin from uncoupling from the yoke. When properly engaged, this arrangement provides for secure coupling between the tractor and trailer. However, accidents often result from improper coupling between the kingpin and the yoke. Such accidents often result when the yoke "jaws" close when the kingpin is not positioned within the space between the jaws, for example when the kingpin is positioned above the yoke. This faulty coupling condition is known as a "top lock".

Occasionally, the kingpin is properly positioned within the yoke, but the jaws fail to close properly around the kingpin such that the jaws and the kingpin are not locked in position. This faulty coupling condition is known as a "false lock".

Other accidents occur when a trailer is moved when the trailer legs are still on the ground or in close proximity to the ground. This can occur when the operator either fails to raise the legs, or in the case of trailers moved by yard trucks, when the operator fails to raise the boom.

There have been a number of attempts to improve tractor trailer coupling arrangements by providing certain safety features. For example, U.S. Pat. No. 5,861,802, Hungerink, teaches an electronic coupling control system comprising a hitch plate movement sensor, a kingpin sensor, a lock sensor, and a system interface in which vehicle operation capabilities may be changed depending upon the sensor readings.

U.S. Pat. No. 5,477,207, Frame, discloses a fifth wheel coupling warning device comprising a proximity sensor which alerts an operator that the latching system is engaged or disengaged such that the operator can determine the state of the coupling system based solely on the signal provided by the warning device.

U.S. Pat. No. 5,625,335, Kelly, discloses a device for monitoring operation of a lock lever of a fifth wheel trailer hitch. U.S. Pat. No. 6,100,794, Hillier, et al. provides a fifth wheel coupling system comprising a detector for detecting when the pull handle is properly positioned in the locking position on the trailer kingpin. U.S. Pat. Nos. 6,285,278, 6,452,485, 7,548,155, Schutt et al. disclose a fifth wheel hitch electronic monitoring system comprising a trailer proximity sensor, a hitch plate movement sensor, a kingpin sensor, and a lock sensor, U.S. Pat. No. 6,587,041, Brown, teaches a system for sensing the presence of a connection between a tractor and trailer. U.S. Pat. Nos. 8,866,283 and 7,140,632, Alguera et al., provide a device for indicating the locking state of a fifth wheel coupling arrangement. U.S. Pat. No. 5,876,055, Fontaine provides an electronic induction switch system to indicate open and closed positions of the locking mechanism and to indicate whether the king pin is properly seated in the locking mechanism.

U.S. Pat. No. 7,253,721, Flohr et al., discloses a coupling monitoring system comprising one or two electronic control units, sensors for sensing a coupling condition of the electronic, mechanical, and/or hydraulic connection. Sensor signals are transmitted to an electronic control unit which, in response, prevents erroneous coupling or uncoupling and prevents drive-away of the vehicle or implement. U.S. Pat. No. 7,619,506, Knoll et al. provides an asset tracking system which comprises a sensor which detects whether a trailer is coupled with a tractor.

U.S. Pat. No. 7,825,783, Gallego, et al. teaches a device for detecting and displaying the position of components of vehicle couplings. U.S. Pat. No. 7,932,816, Schmidt, et al. discloses a device for detecting and displaying the position of vehicle couplings.

U.S. Pat. No. 7,967,319, Alguera, et al. provides a vehicle coupling aid comprising a sensor for detecting the locking of the coupling. U.S. Pat. No. 8,615,347 Alguera, Gallego, et al. provides an anti-theft security device for a vehicle coupling which prevents a semi-trailer from becoming decoupled without authorization.

US Patent Application No. 20080191449, Standen discloses a system comprising a sensor which produces an electrical signal proportional to the vertical distance between hitch assembly and the underside of the trailer.

What is needed is a coupling system which will permit a fifth wheel trailer to be easily connected and safely moved, particularly a system adapted for use by a yard truck moving trailers within a transportation terminal.

SUMMARY OF THE INVENTION

The present invention generally provides a coupling system that permits a fifth wheel trailer to be easily connected and safely moved by a conventional over-the-road tractor or a transportation terminal yard truck.

The system senses for "top lock" and "false lock" coupling conditions, as well as the height of the boom, and is adapted to determine whether there is too much weight on one side of the trailer such that a sharp turn could cause the tractor and/or trailer to overturn.

The system comprises a conventional and commercially available fifth wheel and kingpin coupling arrangement modified with a plurality of proximity sensors which, through a controlled area network (CAN) bus system, transmits data to an engine/electronic control module (ECM)

which, depending upon the sensor readings, can transmit an alert to the operator, transmit a signal to a throttle controller to, for example, reduce the speed of the vehicle to a pr determined limit; or transmit other signals to other control units to alter or change the operating parameters of the tractor.

In one aspect of the invention, a fifth wheel position sensor is adapted to detect whether the fifth wheel is in proper position beneath the trailer chassis; a kingpin sensor is adapted to determine whether the kingpin is properly positioned within a yoke of the fifth wheel; a jaw sensor is adapted to sense whether jaws of the fifth wheel have closed and locked; a fifth wheel height sensor is adapted to detect the distance the fifth wheel has been raised above the tractor chassis; and one or more weight sensors are adapted to measure the weight of the trailer at or near the particular sensor.

One or more fifth wheel position proximity sensors are positioned within a fifth wheel plate. A fifth wheel position sensor bracket is coupled to a lower base of the fifth wheel plate. In one aspect, the fifth wheel position proximity sensor is threaded through the fifth wheel position sensor bracket. A distal end of the fifth wheel position proximity sensor is positioned flush with an upper surface of the fifth wheel plate. The fifth wheel position sensor is adapted to detect whether a trailer plate is positioned within a predetermined distance from the upper surface of the fifth wheel plate. For example, when the fifth wheel is coupled properly to the trailer plate, the fifth wheel plate and trailer plate glide against one another. This close proximity between the fifth wheel plate and the trailer plate permits the kingpin to move within the yoke and become locked by the jaws. If the two plates are not within a very short distance from one another, the kingpin cannot slide within a space between the jaws.

An electronic human/machine interface (HMI) is adapted to display a warning or confirmation that the fifth wheel plate and trailer plate are or are not within the required distance to assure proper kingpin positioning. If the fifth wheel position sensor does not detect that the trailer plate is in proper position, certain engine functions, such as throttle control are changed. For example, if the fifth wheel plate and trailer plate are not in the desired relative positions, the tractor will not move forward without the driver actively disengaging this aspect of the system.

In one embodiment, the system comprises one or more kingpin position proximity sensors positioned near the yoke beneath a space between the fifth wheel jaws. The kingpin position proximity sensor magnetically detects whether the kingpin is in proper position. A kingpin position sensor bracket is coupled to a horizontal support portion of the fifth wheel. A distal end of the kingpin position proximity sensor is adapted to detect when the kingpin is positioned between the jaws. If the kingpin position proximity sensor and the kingpin are not within a very short distance from one another, the kingpin cannot slide within the space between the jaws.

The HMI is adapted to display a warning or confirmation that the kingpin position proximity sensor and kingpin are or are not within the required distance to assure proper kingpin positioning. If the kingpin position proximity sensor does not detect that the kingpin is in proper position certain engine functions, such as throttle control are changed. For example, if the kingpin is not in the desired proximity position to the kingpin sensor, the tractor will not move forward without the driver actively disengaging this aspect of the system.

In some embodiments, one or more jaw sensors are positioned near the jaws and detect whether the jaws have closed. In the preferred embodiment, the one or more jaw sensors magnetically sense whether the jaws have closed properly. The HMI is adapted to display a warning or confirmation that the jaws are not properly closed. If the jaws are not properly closed, certain engine functions, such as throttle control are changed. For example, if the jaws are not properly closed, the tractor will not move forward without the driver actively disengaging this aspect of the system.

In one embodiment, the fifth wheel height sensor is positioned adjacent to the boom which lifts the fifth wheel yoke. As the boom extends, the fifth wheel height sensor magnetically detects the presence of a boom sensor plate when the boom has been raised a pre-determined amount (distance). In the preferred embodiment, this predetermined amount is six or more inches. The fifth wheel height sensor's detection of the presence of the boom sensor plate indicates that the boom has been extended at least the pre-determined amount. When the boom sensor plate is not detected, the operator can conclude that the boom and fifth wheel have not been extended a sufficient amount to raise the trailer legs a sufficient distance from the driving surface/ground. A fifth wheel height sensor distal end is adapted to detect when the fifth wheel height sensor is positioned near the boom sensor plate. If the fifth wheel height sensor and the boom sensor plate are not within a very short distance from one another, this is an indication that the boom has not been lifted six or more inches. If the boom is not lifted six or more inches, the trailer legs may be too close to the ground/driving surface and damage may occur if the trailer is moved.

The HMI is adapted to display a warning or confirmation that the fifth wheel height sensor and boom sensor plate are or are not within the required distance to assure proper boom height. If the fifth wheel height sensor does not detect the boom sensor plate, thus indicating that the boom is not at the proper height, certain engine functions, such as throttle control are changed. For example, if the fifth wheel height sensor is not in the desired proximity position to the boom sensor plate the tractor will not move forward without the driver actively disengaging this aspect of the system.

In some embodiments, conventional and commercially available sensors are used for each of the systems discussed herein. In other embodiments, specially adapted sensors are used. As grease can sometimes contain metal, conventional sensors can, at times, produce false readings. Therefore, in some embodiments a protective cover is positioned over the distal end of the sensor to provide greater accuracy in the readings.

In the preferred embodiment, there are two weight sensors each positioned between the axle housing and tractor frame. The sensors are positioned on each side of the longitudinal center line which divides the left side of the tractor from the right side of the tractor. The weight sensors, through the CAN bus system, transmit data to the ECM which, depending upon the sensor readings can alert the operator or alter or change the tractor operating parameters so as to prevent the tractor or trailer from overturning. In one embodiment, the HMI is adapted to display a warning if a weight differential is beyond predetermined criteria. If such a condition exists, certain engine functions, such as throttle control may be automatically changed. For example, if the weight is 80% on the left side and 20% on the right, the tractor will not move forward without the driver actively disengaging this aspect of the system. In some aspects of the invention, weight sensor readings are displayed on the HMI.

For example, if the weight sensors detect that there is 50% of the weight positioned on the left side and 50% on the right, left and right HMI indications would so indicate.

DESCRIPTION OF THE PREFERRED EMBODIMENT

Referring to FIGS. 1-16, there is shown the coupling system 12 in accordance with preferred embodiments. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment" or similar term means that a particular feature, structure, or characteristic described in connection with the embodiment is included its at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will dearly enable ore skilled in the art to make and use the invention, and describes several embodiments, adaptations, variations, alternatives, and uses of the invention, including what is presently believed to be the best mode of carrying out the invention.

A. General Overview

The coupling system 12 of the current invention permits a fifth wheel trailer 18 to be easily connected and safely moved by a conventional over-the-road tractor or a transportation terminal yard truck 14.

The coupling system 12 presently disclosed senses for "top lock" and "false lock" coupling conditions, as well as the height of the boom 16, and is adapted to determine whether there is too much weight on one side of the trailer 18 such that a sharp turn could cause the tractor 14 and/or trailer 18 to overturn.

The system 12 comprises a conventional and commercially available fifth wheel 20 and kingpin 22 coupling arrangement modified with a plurality of proximity sensors 24, 26, 28, 30 which, through a controlled area network (CAN) bus system 32, transmits data to an engine/electronic control module (ECM) or Programmable Logic Controller 34 which, depending upon the sensor readings, can transmit an alert, to the operator, transmit a signal to a throttle controller to, for example, reduce the speed of the tractor 14 to a pre-determined limit; or transmit other signals to other control units to alter or change the operating parameters of the tractor 14.

In the preferred embodiment, the plurality of sensors 24, 26, 28, 30 comprises a fifth wheel position sensor 24 which is adapted to detect whether the fifth wheel 20 is in proper position beneath the trailer chassis 36 (sometime referred to herein as "tractor frame"); a kingpin sensor 28 adapted to determine whether the kingpin is properly positioned within a yoke 38 of the fifth wheel 20; a jaw sensor 26 which senses whether jaws 56 of the fifth wheel 20 have closed and locked; a fifth wheel height sensor 30 which detects the distance the fifth wheel 20 has been raised above the tractor chassis 36; and one or more weight sensors 40 adapted to measure the weight of the trailer 18 as it rests on the chassis 36 at or near the particular sensor 40.

Referring to FIGS. 1, 7-14, the fifth wheel position system 12 comprises the one or more fifth wheel position proximity sensors 24 positioned within a fifth wheel plate 42. In a preferred embodiment the fifth wheel position proximity sensor 24 is mounted directly to the fifth wheel plate 42. In this embodiment, the fifth wheel position proximity sensor 24 threaded into a through opening 48 within the fifth wheel plate 42.

In another embodiment a fifth wheel position sensor bracket 44 is coupled to a lower base 46 of the fifth wheel plate 42. In such embodiment, the fifth wheel position proximity sensor 24 is threaded through the fifth wheel position sensor bracket 44 or one or more nuts 75 associated with the fifth wheel position sensor bracket 44. The fifth wheel position sensor bracket 44, as well as the through opening 48 within the fifth wheel plate 42, have threading which permit the cooperatively threaded fifth wheel position proximity sensor 24 to be threaded through the bracket 44 and the fifth wheel plate 42 a desired distance.

Figure 7:
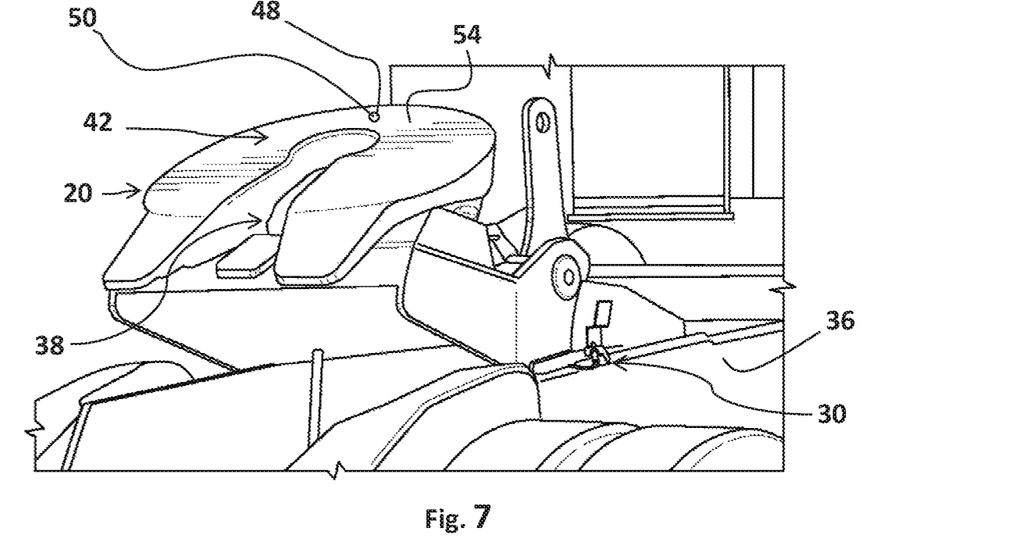
FIG. 7 is an isometric view of the fifth wheel showing the boom height proximity sensor and sensor plate arrangement, and the fifth wheel position sensor in accordance with a preferred embodiment.

Referring to FIG. 7, a distal end 50 of the fifth wheel position proximity sensor 24 in the preferred embodiment, is positioned flush with an upper surface 54 of the fifth wheel plate 42. The fifth wheel position sensor 24 is adapted to detect whether a trailer plate 52 is positioned within a predetermined distance from the upper surface 54 of the fifth wheel plate 42. For example, when the fifth wheel 20 is coupled properly to the trailer plate 52, the fifth wheel plate 42 and trailer plate 52 glide against one another. This close proximity between the fifth wheel plate 42 and the trailer plate 52 permits the kingpin 22 to move within the yoke 38 and become locked by the jaws 56. If the two plates 42, 52 are not within a narrow distance from one another, the kingpin 22 cannot slide within a space between the jaws 56.

Figure 4:
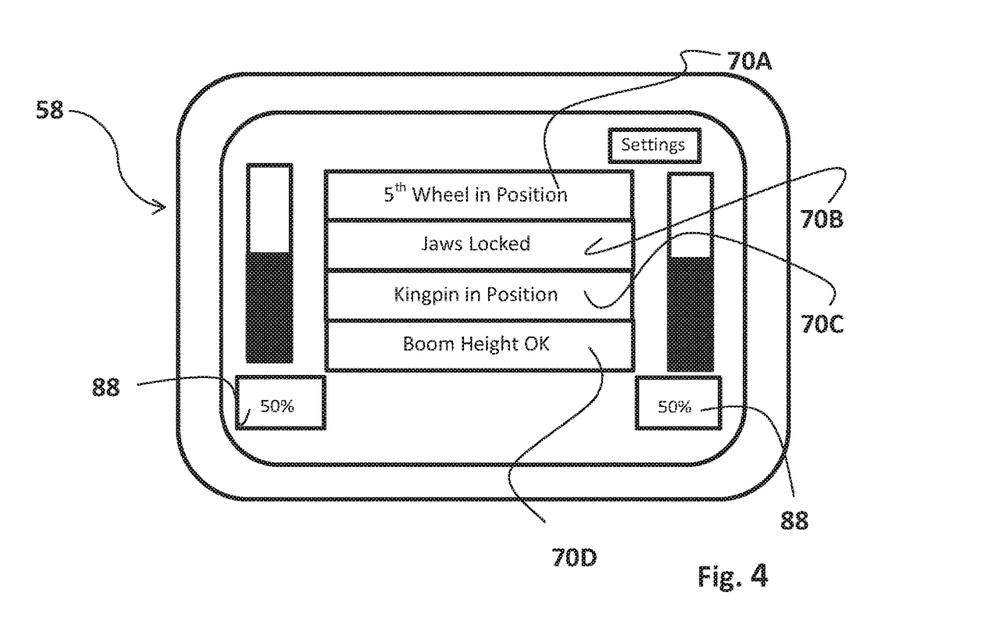
FIG. 4 is a conceptual elevation view of the Human Machine Interface (HMI) showing "all clear" sensor readings, in accordance with a preferred embodiment.
Figure 5:
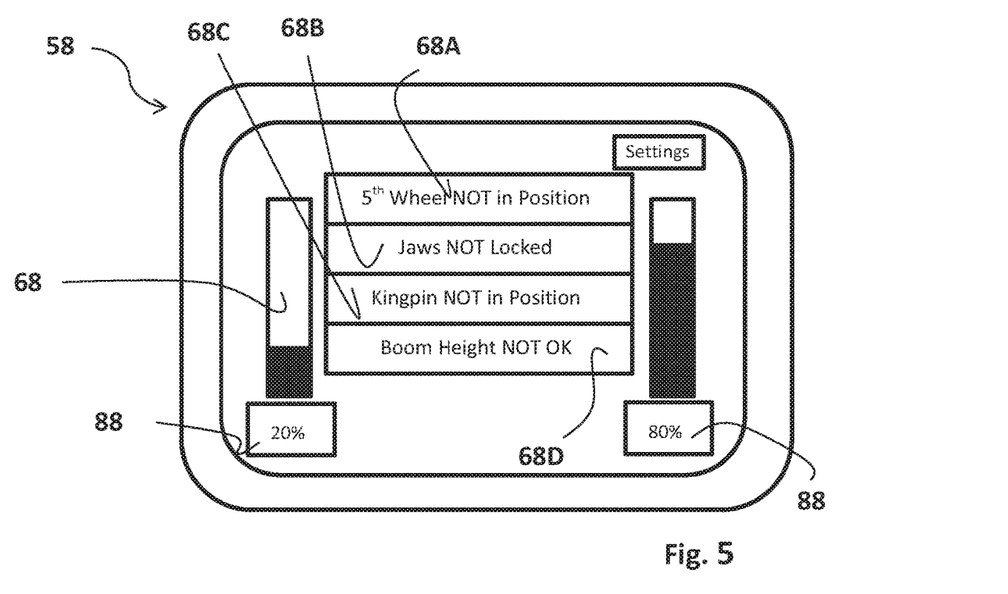
FIG. 5 is a conceptual elevation view of the Human Machine Interface (HMI) showing warning sensor readings, in accordance with a preferred embodiment.

Referring to FIGS. 4 & 5, an electronic human/machine interface (HMI) 58 is adapted to display a warning 68A or confirmation 70A that the fifth wheel plate 42 and trailer plate 52 are or are not within the required distance to assure proper kingpin 22 positioning. If the fifth wheel position sensor 24 does not detect that the trailer plate 52 is in proper position, certain engine functions, such as throttle control are changed. For example, if the fifth wheel plate 42 and trailer plate 52 are not in the desired relative positions, the tractor 14 will not move forward without the driver actively disengaging this aspect of the system 12.

Figure 12:
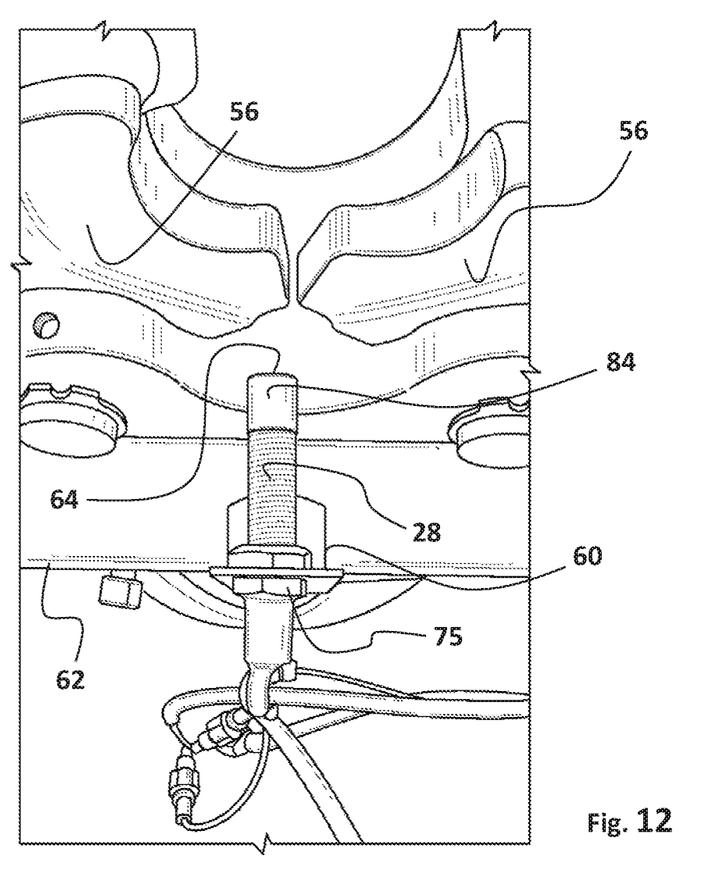
FIG. 12 is an isometric bottom view of the fifth wheel position sensor, in accordance with a preferred embodiment.

Referring to FIG. 12, the system 12 comprises one nr more kingpin position proximity sensors 28 positioned near the yoke 38 beneath a space 66 between the fifth wheel jaws 56. In the preferred embodiment, the kingpin position proximity sensor 28 magnetically detects whether the kingpin 22 is in proper position. A kingpin position sensor bracket 60 is coupled to a horizontal support portion 62 of the fifth wheel 20. In the preferred embodiment, the kingpin position proximity sensor 28 is threaded through the kingpin position sensor bracket 60 or one or more nuts 75 associated with the kingpin position sensor bracket 60. The kingpin position sensor bracket 60 comprises threading which permits the cooperatively threaded kingpin position proximity sensor 28 to be threaded through the bracket 60 a desired distance. A distal end 64 of the kingpin position proximity sensor 28 is adapted to detect when the kingpin 22 is positioned between the jaws 56. If the kingpin position proximity sensor 28 and the kingpin 22 are not within a narrow distance from one another, the kingpin 22 cannot slide within the space 66 between the jaws 56.

The HMI 58 is adapted to display a warning 68C or confirmation 70C that the kingpin position proximity sensor 28 and kingpin 22 are or are not within the required distance to assure proper kingpin 22 positioning. If the kingpin position proximity sensor 28 does not detect that the kingpin 22 is in proper position, certain engine functions, such as throttle control are changed. For example, if the kingpin 22 is not in the desired proximity position to the kingpin sensor 28, the tractor 14 will not move forward without the driver actively disengaging this aspect of the system 12.

In some embodiments, one or more jaw sensors 26 are positioned near the jaws 56 and detect whether the jaws 56 have closed. In the preferred embodiment, the one or more jaw sensors 26 magnetically sense whether the jaws 56 have closed properly. These jaw sensors 26 are similar to the sensors 24, 28 described above. The HMI 58 is adapted to display a warning 68B or confirmation 70B that the jaws 56 are not properly closed. If the jaws 56 are not properly closed, certain engine functions, such as throttle control are changed. For example, if the jaws 56 are not properly closed, the tractor 14 will not move forward without the driver actively disengaging this aspect of the system 12.

Figure 6:
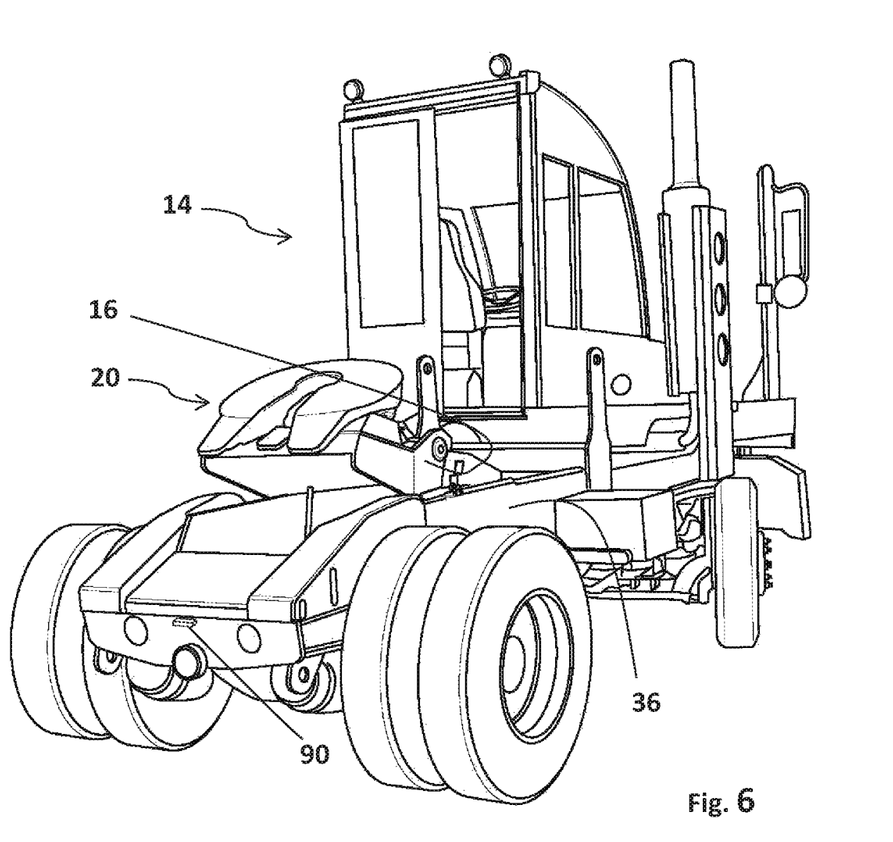
FIG. 6 is a right side and rear isometric view of a yard truck with the fifth wheel boom in an extended position.
Figure 8:
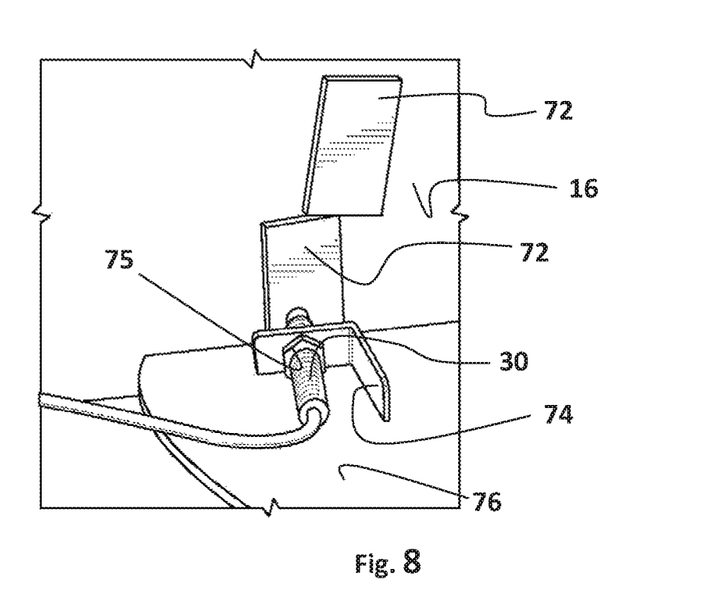
FIG. 8 is a close-up view of the boom height proximity sensor of FIG. 7.
Figure 9:
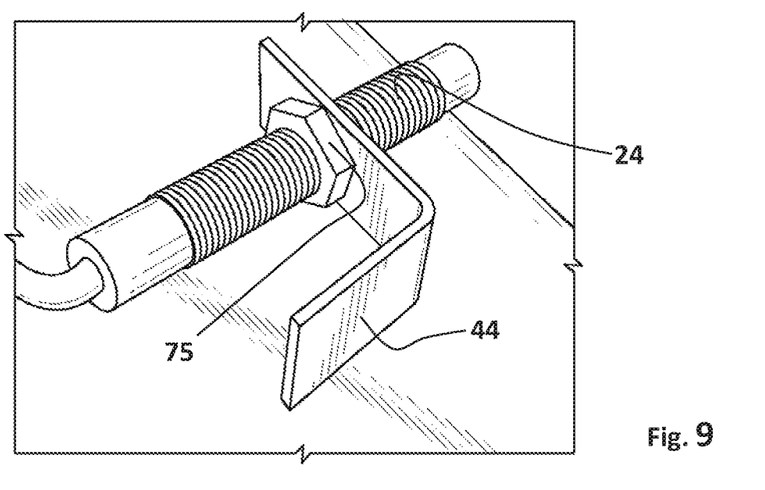
FIG. 9 is another view of the sensors of FIGS. 7 and 8.
Figure 10:
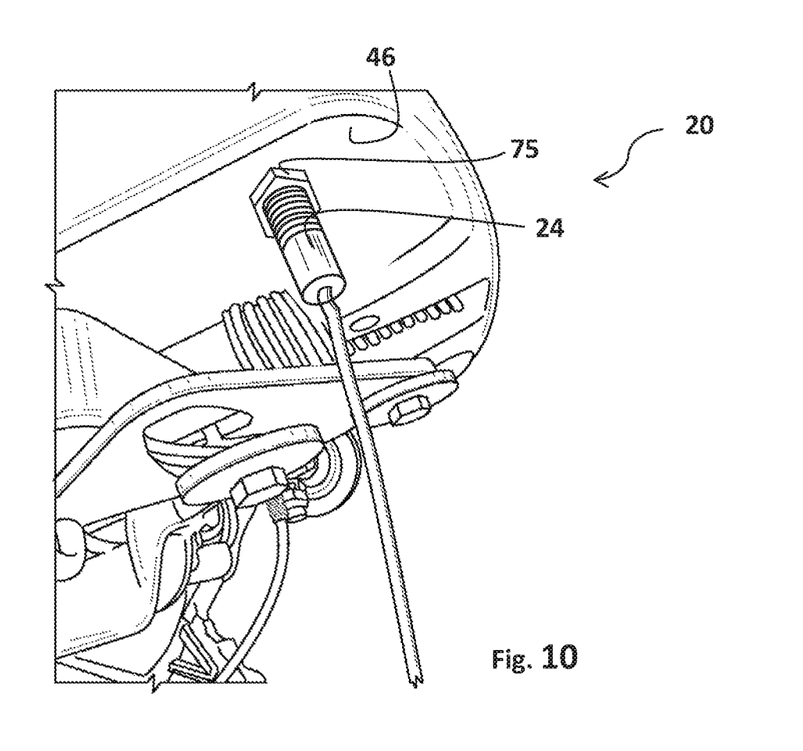
FIG. 10 an isometric view of the kingpin sensor positioned beneath the fifth wheel top plate, in accordance with a preferred embodiment.
Figure 11:
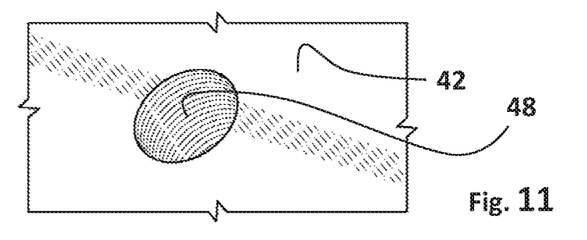
FIG. 11 is an isometric top view of a threaded opening which may be used to position certain proximity sensors.

Referring to FIGS. 6-8, the fifth wheel height sensor 30 is positioned adjacent to the boom 16 which lifts the fifth wheel yoke 38. As the boom 16 extends, the fifth wheel height sensor 30 magnetically detects the presence of one or more boom sensor plates 72 when the boom 16 has been raised a pre-determined distance. In the preferred embodiment, this predetermined amount is six or more inches. The fifth wheel height sensor's 30 detection of the presence of the boom sensor plate 72 indicates that the boom 16 has been extended at least the pre-determined amount. When the boom sensor plate 72 is not detected, the operator can conclude that the boom 16 and fifth wheel 20 have not been extended a sufficient amount to raise the trailer legs 80 a sufficient distance from the driving surface/ground 82. In the preferred embodiment, a fifth wheel height sensor bracket 74 is coupled to an upper surface 76 of the tractor chassis 36. In the preferred embodiment, the fifth wheel height sensor 30 is threaded through the fifth wheel height sensor bracket 74 or one or more nuts 75 associated with the fifth wheel height sensor bracket 74. The fifth wheel height sensor bracket 74 has threading which permits the cooperatively threaded fifth wheel height sensor 30 to be threaded through the height sensor bracket 74 a desired distance. A fifth wheel height sensor distal end 78 is adapted to detect when the fifth wheel height sensor 30 is positioned near the boom sensor plate 72. As discussed above, if the fifth wheel height sensor 30 and the boom sensor plate 72 are not within a very short distance from one another, this is an indication that the boom 16 has not been lifted six or more inches. If the boom 16 is not lifted six or more inches, the trailer legs 80 may be too close to the ground/driving surface 82 and damage may occur if the trailer 18 is moved.

The HMI 68 is adapted to display a warning 68D or confirmation 70D that the fifth wheel height sensor 30 and boom sensor plate 72 are or are not within the required distance to assure proper boom 16 height. If the fifth wheel height sensor 30 does not detect the boom sensor plate 72, thus indicating that the boom 16 is not at the proper height, certain engine functions, such as throttle control are changed. For example, if the fifth wheel height sensor 30 is not in the desired proximity position to the boom sensor plate 72, the tractor 14 will not move forward without the driver actively disengaging this aspect of the system 12.

In some embodiments convent oral and commercially available sensors 24, 26, 28, 30 are used for each of the systems discussed herein. In other embodiments, specially adapted sensors 24, 26, 28, 30 are used. As grease can sometimes contain metal, conventional sensors 24, 26, 28, 30 can, at times, produce false readings. Therefore, in some embodiments a protective cover 84 is positioned over the distal end of the sensor 24, 26, 28, 30 to provide greater accuracy in the readings.

Figure 13:
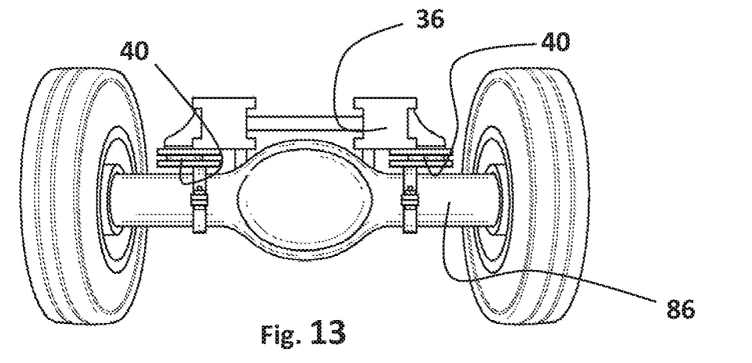
FIG. 13 is a rear elevation view of a yard truck chassis with weight sensors mounted between the axle housing and frame.
Figure 14:
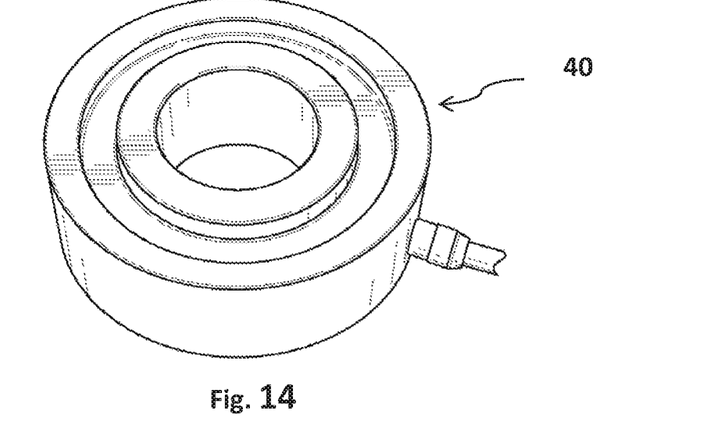
FIG. 14 an isometric top view of a conventional and corer commercially available weight sensor.
Figure 15:
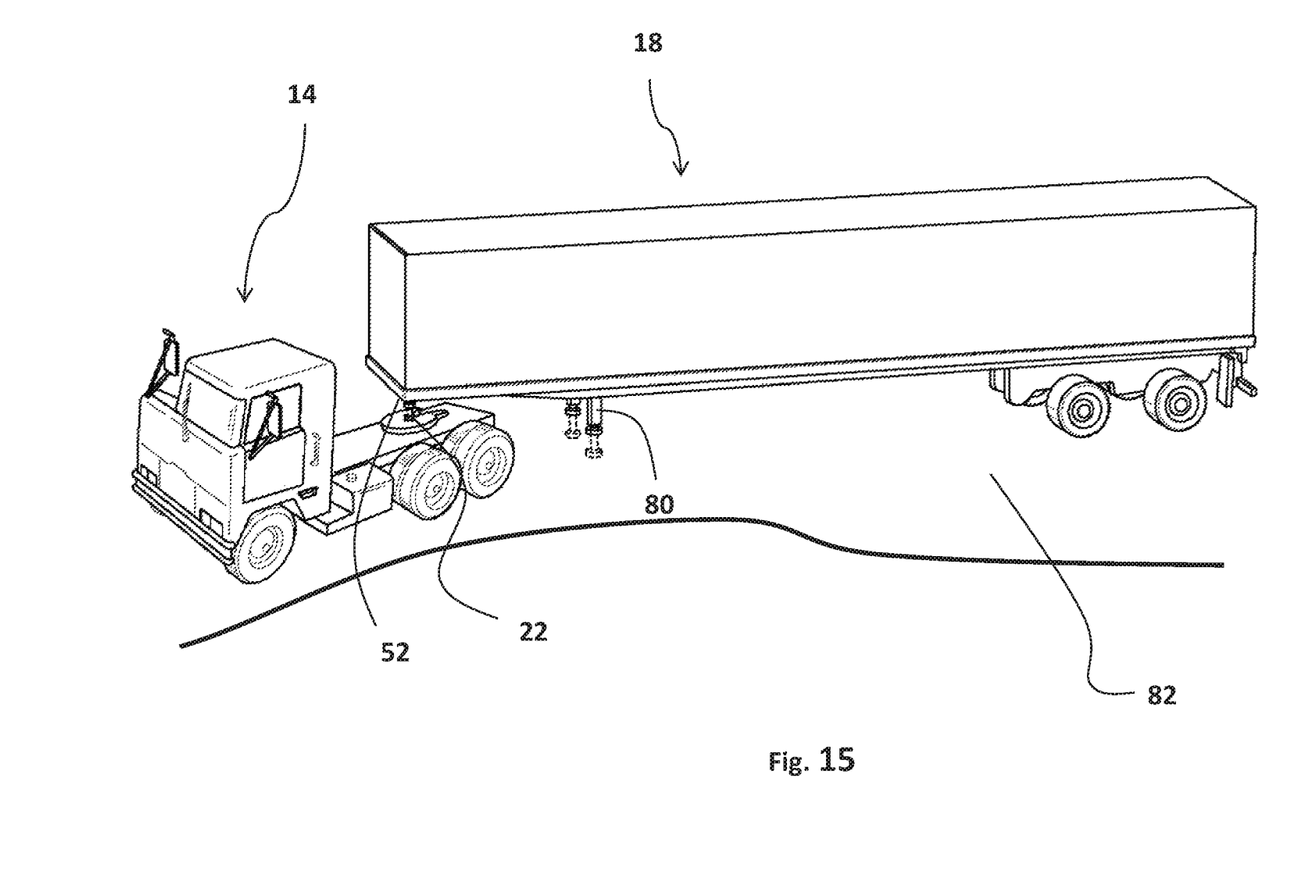
FIG. 15 is an isometric view of a yard truck equipped with the coupling system of the preferred embodiment with the truck coupled to a container.

Referring to FIGS. 13-14, in the preferred embodiment, there are two weight sensors 40, 40, each positioned between the axle housing 86 and tractor frame 36. The sensors 40, 40, are positioned on each side of the longitudinal center line which divides the left side of the tractor 14 from the right side of the tractor 14. The weight sensors 40, 40, through the CAN bus system 32, transmit data to the ECM 34 which, depending upon the sensor 40, 40 readings can alert the operator or alter or change the tractor 14 operating parameters so as to prevent the tractor 14 or trailer 18 from overturning. The HMI 58 is adapted to display a warning 68 if a weight differential is beyond predetermined criteria. If such a condition exists, certain engine functions, such as throttle control may be automatically changed. For example, as shown in FIG. 5, if the weight is 80% on the right side and 20% on the left, the tractor 14 will not move forward without the driver actively disengaging this aspect of the system 12. In some aspects of the invention, weight sensor 40, 40 readings 88 are displayed on the HMI. For example, as shown in FIG. 4, if the weight sensors 40, 40 detect that there is 50% of the weight positioned on the left side and 50% on the right, left and right HMI indications 88, 88 would so indicate.

Figure 1:
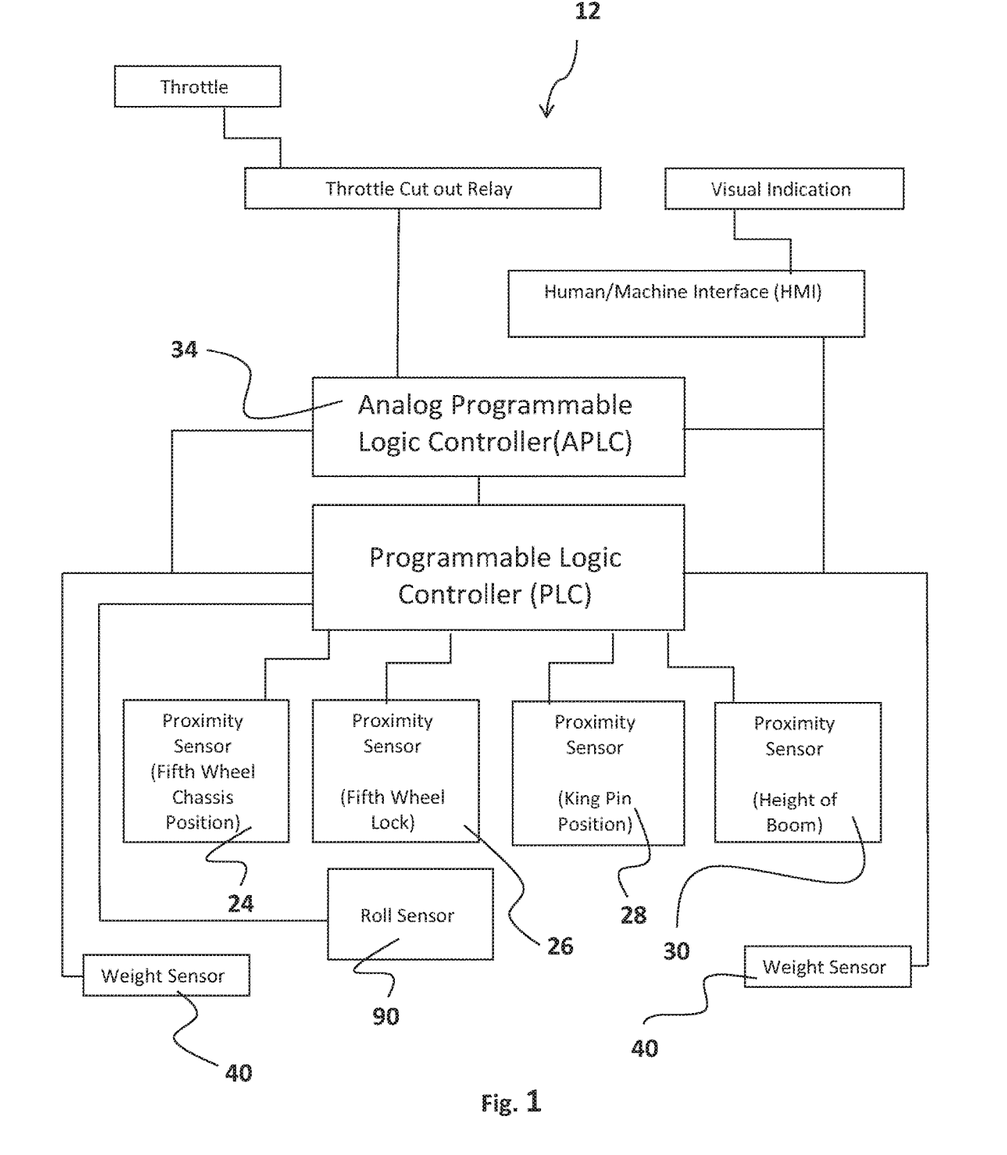
FIG. 1 is a block diagram of the coupling system, in accordance with a preferred embodiment.
Figure 2:
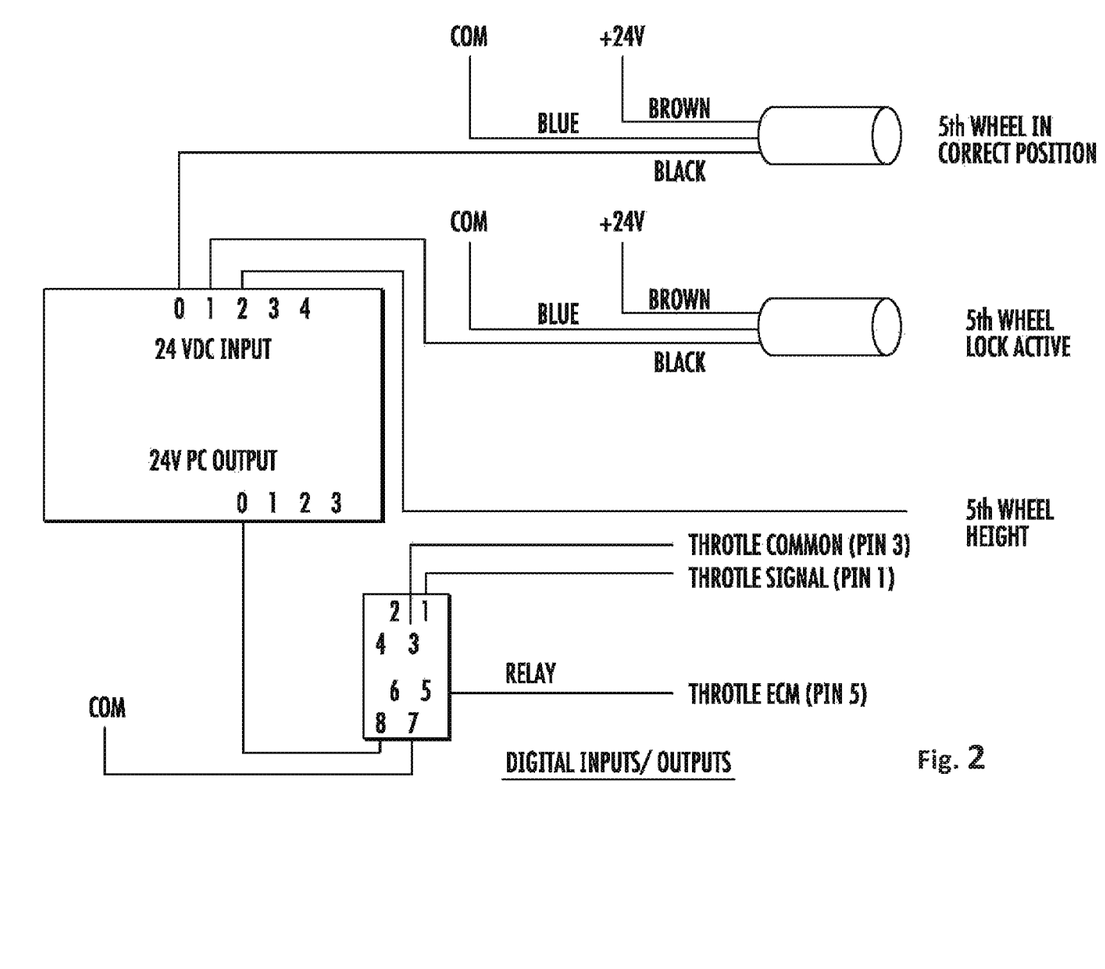
FIG. 2 is a block diagram of the coupling system's sensor input/output arrangement, in accordance with a preferred embodiment.
Figure 3:
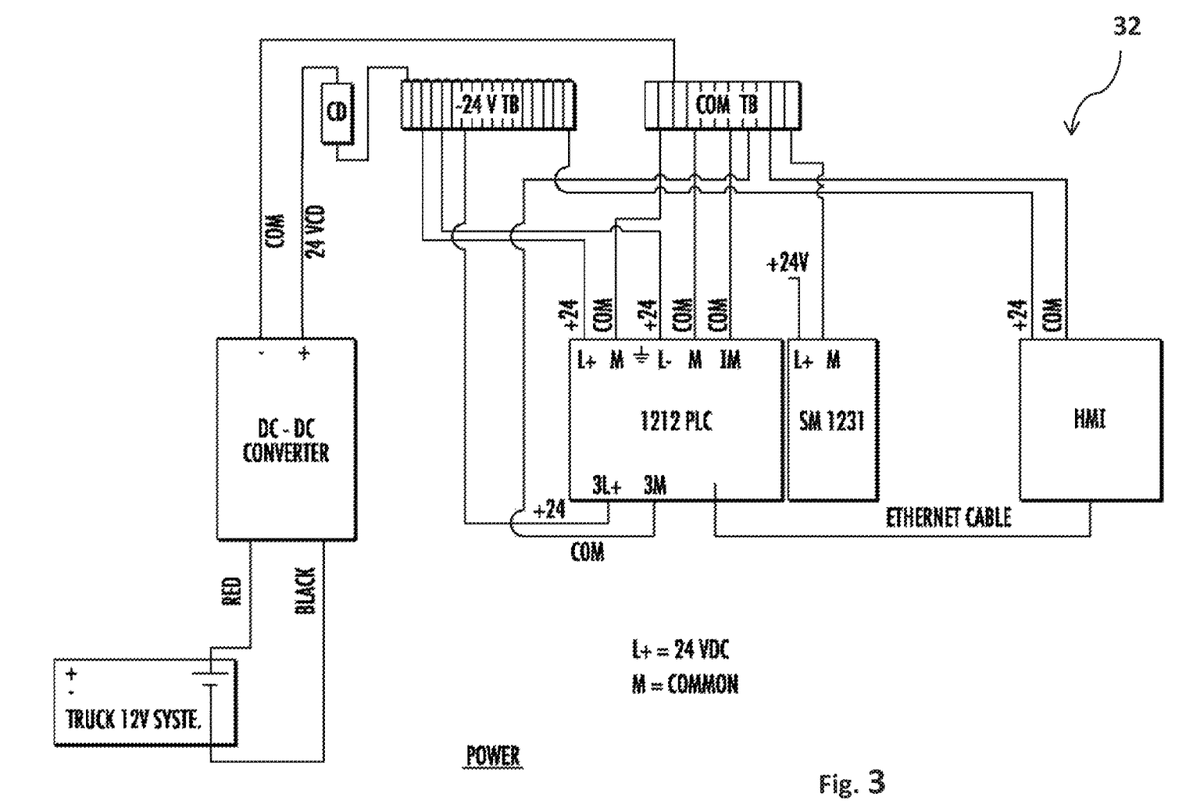
FIG. 3 is a block diagram of the coupling system's electrical arrangement in, accordance with a preferred embodiment.
Figure 16:
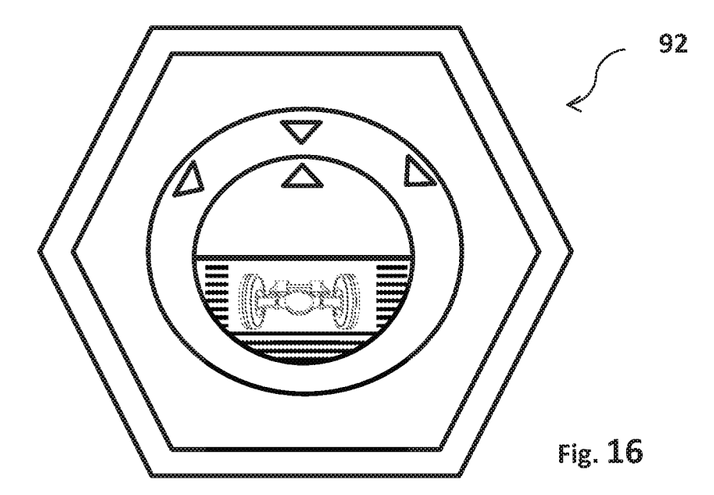
FIG. 16 is an elevation view of the artificial horizon display generated by the roll sensor.
Figure 17:
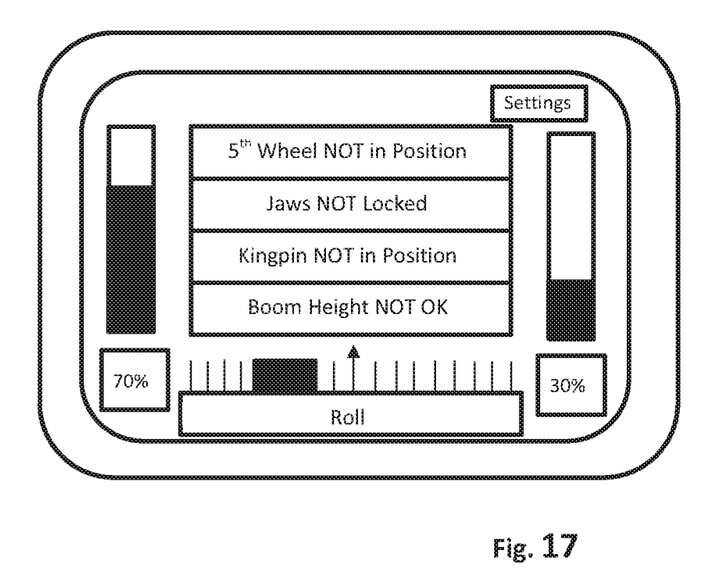
FIG. 17 is a conceptual elevation view of the Human Machine Interface (HMI) showing roll sensor warnings, in accordance with a preferred embodiment.

Referring to FIGS. 1, 6, and 16, in a preferred embodiment, the system comprises a roll sensor 90 comprising a gimbal and accelerometer. The roll sensor 90 is mounted on the underside of the frame 36 at the rear of the tractor 14. In the preferred embodiment, the roll sensor comprises a combination 3-axis gyroscope and a 3-axis accelerometer on the same silicon die together with an onboard digital processor adapted to process sensor readings. The roll sensor 90 is positioned near the longitudinal center line which divides the left side of the tractor 14 from the right side of the tractor 14. The roll sensor 90, through the CAN bus system 32, and/or dedicated controller board, transmits data to the ECM 34 which, depending upon the roll sensor 90 readings, can alert the operator or alter or change the tractor 14 operating parameters so as to prevent the tractor 14 or trailer 18 from overturning. In the preferred embodiment, selected roll sensor 90 readings are displayed on an artificial horizon display 92 (FIG. 16). The artificial horizon display 92 and/or the HMI 58 (FIG. 17) are adapted to display a warning 68 if the tractor 14 rolls beyond predetermined criteria. If such a condition exists, certain engine functions, such as throttle control may be automatically changed. For example, as shown in FIG. 17, if the roll sensor 90 determines that that the tractor has rolled or tipped beyond a certain acceptable angle, the tractor 14 will slow.

B. Matters General to Many Embodiments

While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of this disclosure.

For example, other sensors 24, 26, 28, 30, other than magnetic sensors 24, 26, 28, 30 may be used. Different engine parameters or functionality, in addition to speed reduction can be automatically changed as a result of sensor 24, 26, 28, 30 readings. Different computer/electronic modules 34 may be used to implement the system 12 than those shown in the figures. The sensors 24, 26, 28, 30, 40 can be used alone or in combination with other sensors 24, 26, 28, 30, 40 and arrangements.

I claim:

1. A vehicle fifth wheel safety system comprising:
a vehicle comprising a frame and a fifth wheel, the fifth wheel being positioned on a boom adapted to position the fifth wheel;
the frame comprising a height sensor adapted to determine whether the boom has been raised to a pre-determined height;
the height sensor being positioned adjacent to the boom;
a portion of the boom comprising a boom plate;
the boom plate being positioned adjacent to the height sensor when the boom is in a first position; and
the boom plate being positioned away from the height sensor when the boom is in a second position.

2. The vehicle fifth wheel safety system of claim 1, further comprising:
an ECM in communication with the CAN Bus system and adapted to send a signal to a throttle controller in response to a height sensor reading and prohibiting a vehicle position to be changed until a pre-determined height sensor reading is obtained.

3. A vehicle fifth wheel safety system comprising:
a fifth wheel comprising a yoke, a plurality of proximity sensors;
the proximity sensors comprising a kingpin sensor, a jaw sensor, a fifth wheel position sensor, and a boom height sensor, the sensors being in communication with a CAN bus system;
the kingpin sensor being adapted to determine whether the kingpin is properly positioned within the yoke;
the jaw sensor being adapted to determine whether the jaws have closed and locked;
the fifth wheel position sensor adapted to determine whether the fifth wheel and a trailer plate are in a desired position;
the boom height sensor adapted to determine whether a boom has been raised to a pre-determined height; and
an ECM in communication with the CAN Bus system and adapted to send a signal to a throttle controller in response to the sensors' readings such that a speed of the vehicle can be adjusted to a predetermined level.

4. The vehicle fifth wheel safety system of claim 3 the fifth wheel position sensor being positioned within a fifth wheel plate such that a distal end of the fifth wheel position sensor is generally flush with an upper surface of the fifth wheel plate.

5. The vehicle fifth wheel safety system of claim 3, the kingpin sensor being positioned adjacent to the yoke beneath a space between the jaws.

6. The vehicle fifth wheel safety system of claim 3, the jaws comprising first and second jaw members, the jaw sensor being positioned adjacent to at least one of said jaw members.

7. The vehicle fifth wheel safety system of claim 3:
the vehicle comprising a frame;
the boom comprising a boom plate;
the boom height sensor being positioned on the frame; and
the boom plate being adjacent to the height sensor when the boom is in a first position and away from the height sensor when the boom is in a second position.

8. The vehicle fifth wheel safety system of claim 3, further comprising one or more weight sensors adapted for sensing a weight of at least a portion of a trailer coupled to the vehicle.

9. The vehicle fifth wheel safety system of claim 8, the vehicle comprising a frame and an axle housing, the one or more weight sensors being mounted between the axle housing and the frame.

10. The vehicle fifth wheel safety system of claim 9:
the one or more weight sensors comprising first and second weight sensors;
the first weight sensor being positioned on a left side of a longitudinal center of the vehicle; and
the second weight sensor being positioned on a right side of the longitudinal center of the vehicle.

11. The vehicle fifth wheel safety system of claim 3, further comprising one or more roll sensors adapted to detect whether the vehicle has tipped beyond a predetermined angle.

12. The vehicle fifth wheel safety system of claim 11, the roll sensor comprising, in combination, a gyroscope and accelerometer.

13. A method of coupling a vehicle and a trailer, the method comprising the following steps:
 providing a vehicle comprising a fifth wheel comprising a yoke, jaws, and a plurality of sensors;
 providing a trailer comprising a kingpin;
 the sensors comprising a kingpin sensor, a jaw sensor, a fifth wheel position sensor, and a boom height sensor;
 positioning the vehicle beneath a trailer plate of the trailer;
 using the kingpin sensor, determining whether the kingpin is properly positioned within the yoke;
 using the jaw sensor, determining whether the jaws have closed and locked;
 using the fifth wheel position sensor, determining whether the fifth wheel and a trailer plate are in a desired position; and
 using the boom height sensor, determining whether the boom has been raised to a pre-determined height.

14. The method of coupling a vehicle and a trailer of claim 13 further comprising the steps of:
 providing a CAN bus system and an ECM, the CAN bus system communicatively connected to the plurality of sensors and the ECM.

15. The method of coupling a vehicle and a trailer of claim 14, after the step of "using the boom height sensor, determining whether the boom has been raised to a pre-determined height", the steps of:
 sending an ECM signal to a throttle controller in response to one or more sensor readings; and
 adjusting a speed capability of the vehicle based upon said one or more sensor readings.

16. The method of coupling a vehicle and a trailer of claim 15, the one or more sensors further comprising one or more weight sensors being mounted between the axle housing and the frame.

17. The method of coupling a vehicle and a trailer of claim 15, the one or more sensors further comprising one or more roll sensors.

18. The method of coupling a vehicle and a trailer of claim 17, after the step of "sending an ECM signal to a throttle controller in response to one or more sensor readings", the step of:
 using one or more determinations obtained by using the one or more sensors, displaying the one or more determinations to a user.

19. The method of coupling a vehicle and a trailer of claim 18, comprising the step of:
 using the one or more determinations obtained by using the one or more sensors, prohibiting a vehicle position to be changed until a pre-determined combination of sensor readings is obtained.

* * * * *